A. J. ANDERSON.
HEAT DEFLECTOR AND DRAFT CREATING DEVICE.
APPLICATION FILED DEC. 31, 1920.
1,391,291.
Patented Sept. 20, 1921.
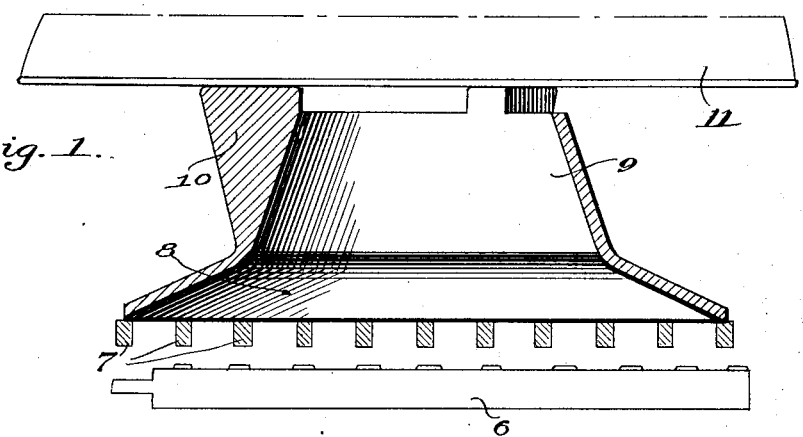
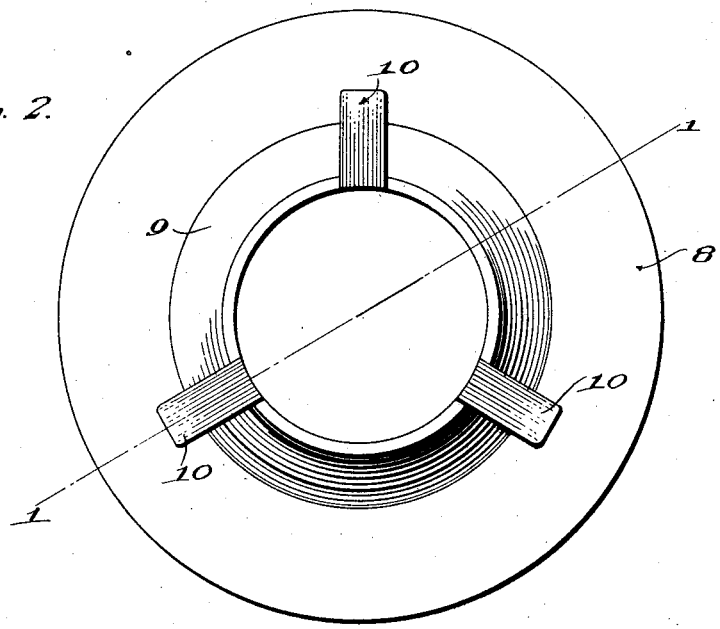
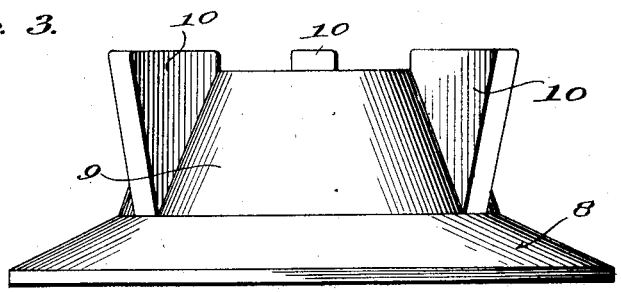
WITNESSES
INVENTOR
A. J. Anderson,
BY
ATTORNEYS

UNITED STATES PATENT OFFICE.

ALBERT JULIUS ANDERSON, OF ASHTABULA, OHIO.

HEAT-DEFLECTOR AND DRAFT-CREATING DEVICE.

1,391,291.

Specification of Letters Patent.  Patented Sept. 20, 1921.

Application filed December 31, 1920. Serial No. 434,300.

*To all whom it may concern:*

Be it known that I, ALBERT J. ANDERSON, a citizen of the United States of America, residing at Ashtabula, in the county of Ashtabula and State of Ohio, have invented certain new and useful Improvements in Heat-Deflectors and Draft-Creating Devices, of which the following is a specification.

My invention relates to a heat deflector and draft creating device and has particular reference to a device to be placed over a burner on a liquid or gaseous fuel cooking stove to concentrate and intensify the flame passing through said device.

An object of the invention is to provide a device especially adapted for use in connection with burners on liquid or gaseous fuel cooking stoves, to be placed over the same to draw the flame from the burner and to direct the heat in a concentrated and intensified form against the bottom of a domestic cooking utensil placed above the device.

A further object of the invention is to provide a device adapted to be placed on the grate above the burner, which is so constructed that the passage of the flame through the device will create a suction, drawing up air between the burner and the device, which air commingles with the flame and is conducted upwardly in the form of a concentrated intensified flame possessing a high heat value.

A further object of the invention is to provide a device of the above mentioned character which will effect a considerable saving of fuel and which can be used with a burner of any well known or preferred construction without alteration of the structure of such burner.

A still further object of this invention is to provide a device of the above mentioned character which is simple in construction, inexpensive to manufacture, reliable in operation, and strong and durable.

In the accompanying drawings forming a part of this specification and in which like numerals are employed to designate like parts throughout the several views:

Figure 1 is a vertical sectional view of my improved device on the line 1—1 of Fig. 2, Fig. 2 is a plan view of the same, and, Fig. 3 is a side elevation of the same.

Referring to the drawings wherein for the purpose of illustration is shown a preferred embodiment of my invention, the numeral 6 represents a burner of a liquid or gaseous fuel cooking stove of any well known or preferred construction, above which is arranged the ordinary grating 7. Adapted to be arranged upon the grating 7 above the burner 6 and concentric therewith is shown my improved draft creating and heat deflecting device, comprising the hollow outwardly flaring frusto-conical base portion 8 and the hollow frusto-conical body portion 9 formed integrally upon the upper open edge of said base. Carried by the body portion 9 is a series of radially extending lugs 10 projecting slightly above the upper open edge of the body portion 9 and adapted to support thereon a domestic cooking utensil 11.

In the operation of my improved device, the liquid or gaseous fuel is ignited as it leaves the burner 6 and the passage of the heat upwardly through the device creates a suction which draws up the flame. This suction also draws in air between the burner 6 and grating 7, which air commingles with the flame drawn through the upwardly inclined passage and impinges against the bottom of the domestic cooking utensil 11 in a concentrated and intensified form. Supporting lugs 10 hold the bottom of the utensil 11 in spaced relation above the upper open edge of the body portion 9 thus forming outlet openings for creating a draft or suction and through which the flame passes. It will be noticed that the lower portion 8 flares outwardly at an angle relative to the upper portion 9 so that the bottom of the device covers the maximum area of grate and burner and as the lower portion 8 has its inner walls inwardly and upwardly inclined at an acute angle, the heat from the border of the burner is deflected and concentrated toward the center of the device at a point relatively close to the grate and burner, the heat so concentrated passing then into the upper relative contracted zone 9 of the device.

Having thus described my invention, I claim:—

1. A heat deflecting and draft creating device adapted for arrangement above a burner and concentric therewith; said device having a passage therethrough, the wall of the passage including a lower zone adjacent the border of the burner and arranged at an angle to the line of draft of the burner for initially deflecting the heat rising from the border of the burner toward the center of the passage; and a zone above the lower zone arranged at a lesser angle to the line of draft than the lower zone for gradually concentrating the heat from the entire burner.

2. A heat deflecting and draft creating device placed above a burner, comprising a block having a vertical bore therethrough, and formed with an upper and lower portion, the lower portion being flared outwardly at an obtuse angle relative to the upper portion and the upper portion being relatively smaller than the lower portion, whereby the heat from the burner will be concentrated within the lower portion at a point relatively near to the burner and will be directed thence through the upper portion to a domestic cooking vessel placed above the device.

3. In a device of the character described, a block having a vertical bore therethrough and formed with an upper and a lower portion, the lower portion being flared outwardly and the upper portion being flared inwardly to constrict the bore of the block, and a series of laterally extending lugs carried by the block and projecting slightly beyond the upper end thereof.

ALBERT JULIUS ANDERSON